United States Patent [19]

Lewis

[11] Patent Number: 5,281,811
[45] Date of Patent: Jan. 25, 1994

[54] DIGITAL WAVELENGTH DIVISION MULTIPLEX OPTICAL TRANSDUCER HAVING AN IMPROVED DECODER

[75] Inventor: Warren H. Lewis, Blacksburg, Va.

[73] Assignee: Litton Systems, Inc., Beverly Hills, Calif.

[21] Appl. No.: 716,224

[22] Filed: Jun. 17, 1991

[51] Int. Cl.⁵ .................. G01J 3/50; G01D 5/34
[52] U.S. Cl. ................ 250/226; 250/227.23; 250/231.18
[58] Field of Search .......... 250/227.18, 227.21, 250/227.23, 231.13, 231.18, 226, 237 G; 341/13, 14

[56] References Cited

U.S. PATENT DOCUMENTS

| | | | |
|---|---|---|---|
| 4,223,216 | 9/1980 | Quick et al. | 250/226 |
| 4,362,358 | 12/1982 | Hafle | 250/227.23 |
| 4,409,476 | 10/1983 | Löfgren et al. | 250/227.23 |
| 4,857,726 | 8/1989 | Kinney et al. | 250/227.23 |
| 4,947,038 | 8/1990 | Wiesmeier et al. | 250/227.23 |
| 5,004,910 | 4/1991 | Arnet | 250/231.18 |

FOREIGN PATENT DOCUMENTS 0095316  4/1988  Japan ............... 250/237.21

Primary Examiner—Edward P. Westin
Assistant Examiner—Stephone Allen
Attorney, Agent, or Firm—Gerald L. Lett

[57] ABSTRACT

A fiber optic optical transducer or encoder is described. The outputs of two detectors receiving signals from an optical multiplexer/demultiplexer arrangement are compared to determine whether a given code bit is "on" or "off". When the bit is "on" the power received by the second detector will, for example, be greater than the power received by a first detector. When the bit is "off" the reverse is true. A simple power level comparison thus determines the logic state of each given code bit.

5 Claims, 5 Drawing Sheets

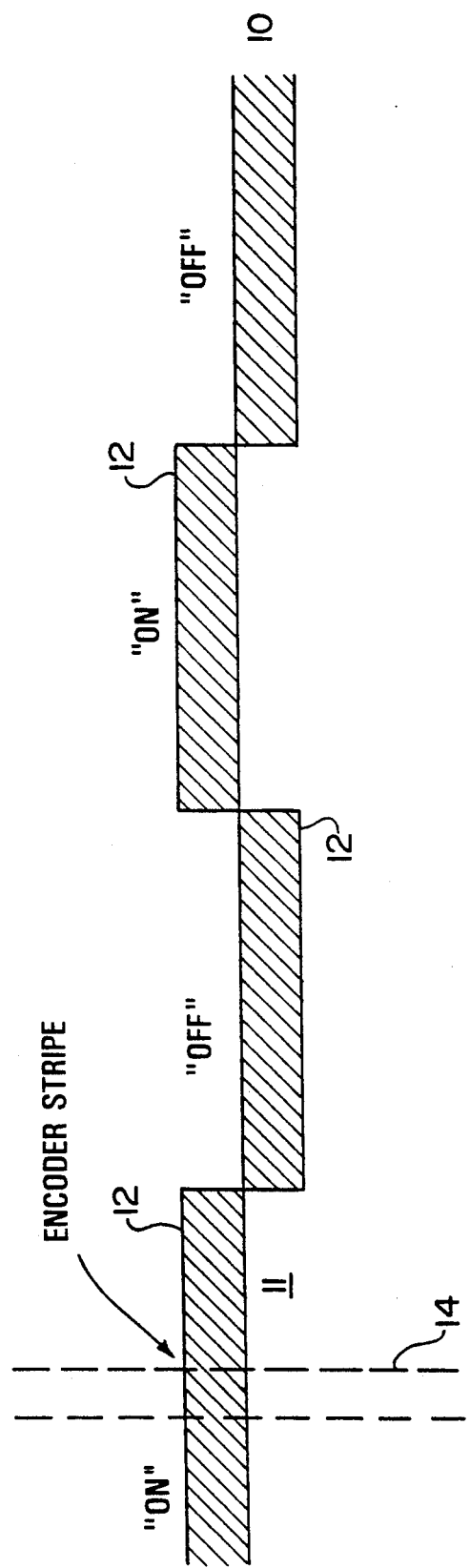

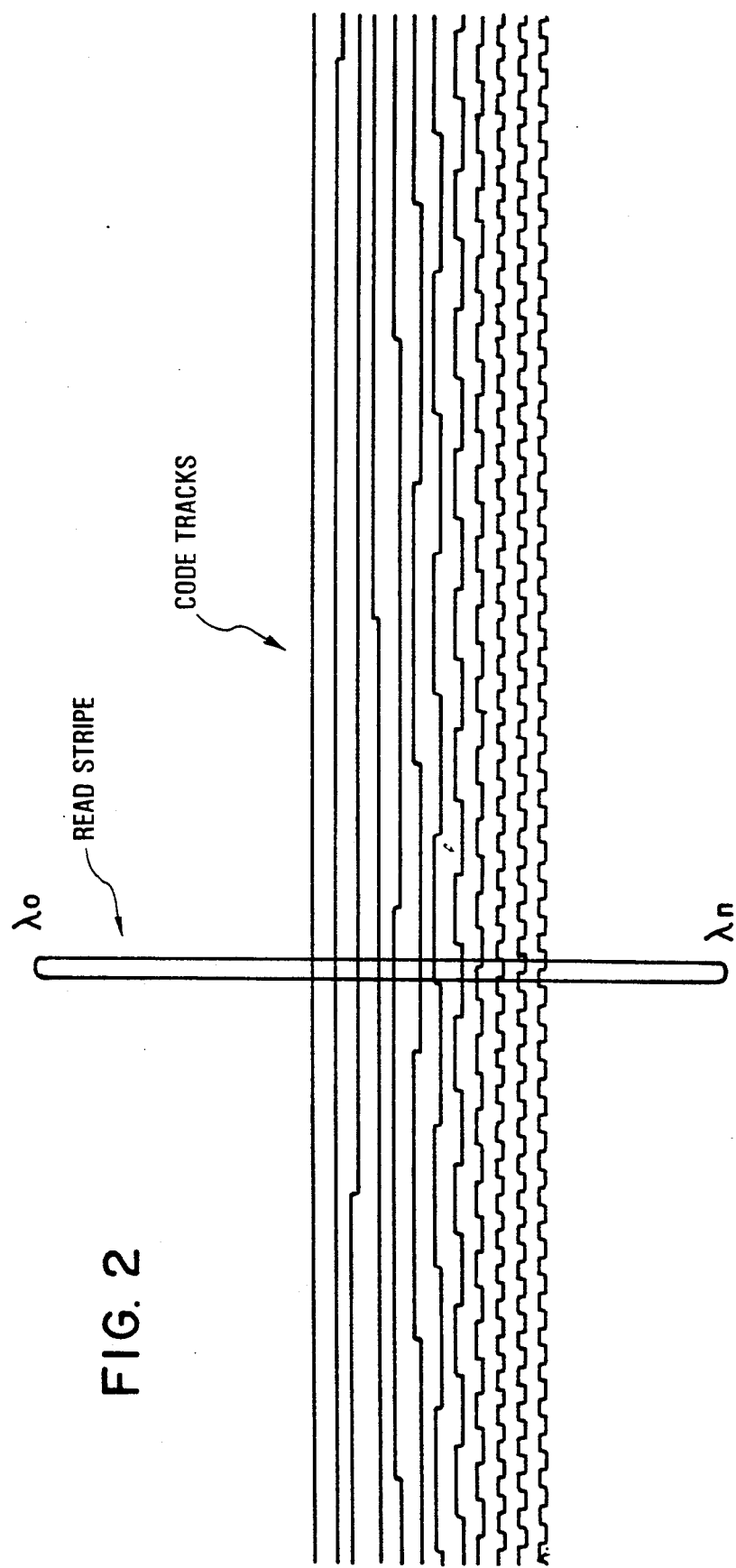

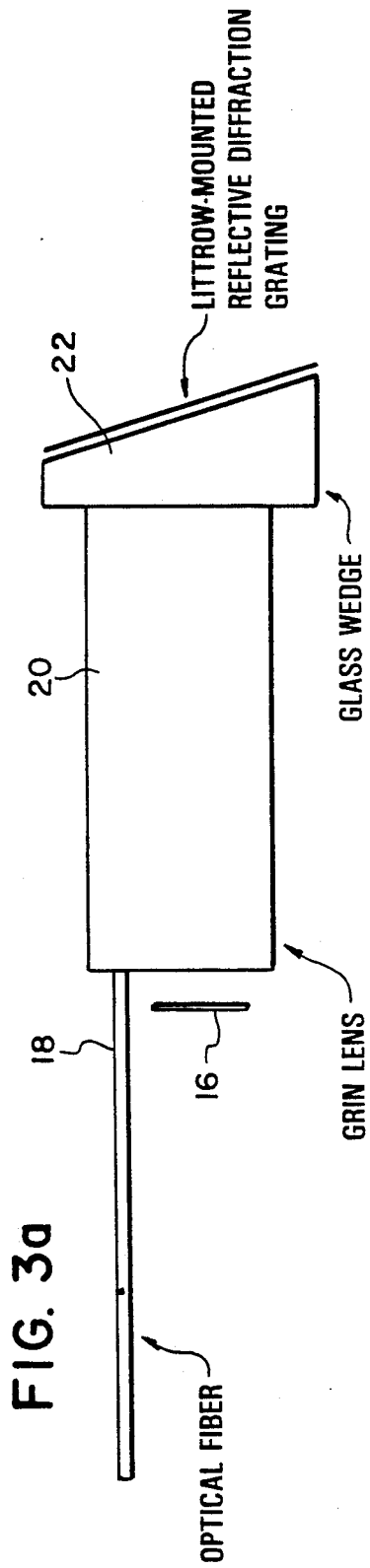
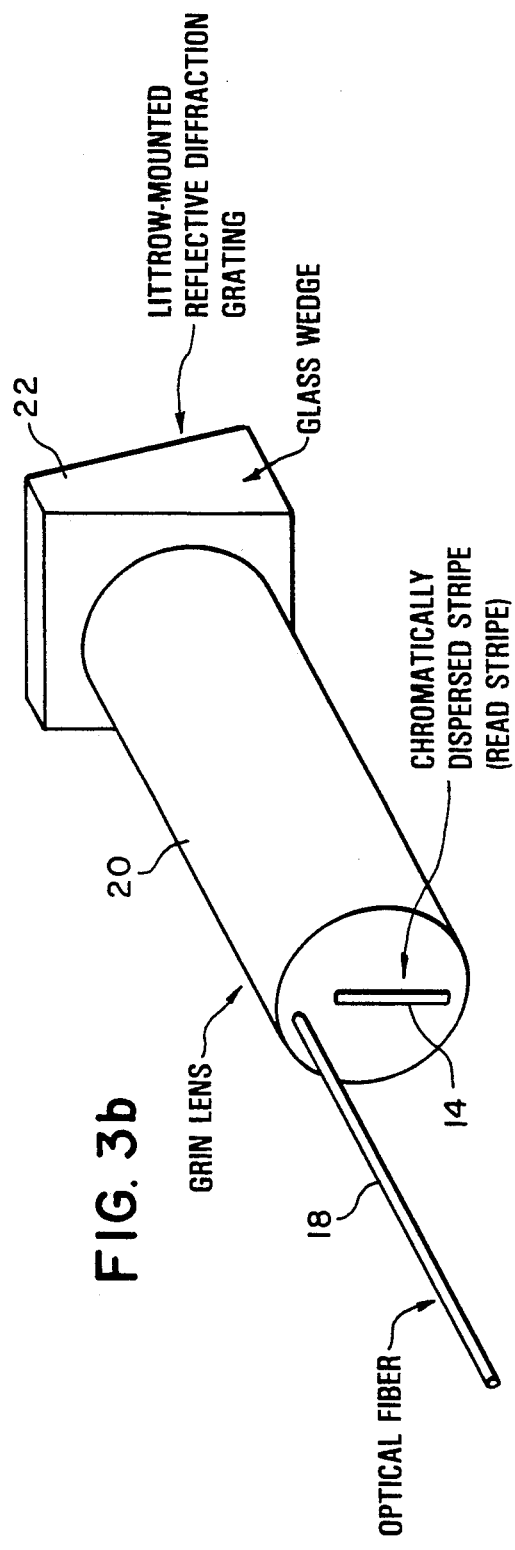

DIGITAL WAVELENGTH DIVISION MULTIPLEX OPTICAL TRANSDUCER HAVING AN IMPROVED DECODER

BACKGROUND OF THE INVENTION

This invention relates to a fiber optic optical transducer, and more particularly, the invention relates to such a transducer which produces digital information.

Electrically passive optical transducers or encoders using fiber optic components have become of considerable interest for a wide variety of applications. Numerous applications exist for rotary and linear encoders which are capable of producing digital information. In order, however, for these encoders to find widespread application, it was determined that multiplexing of the encoder signals is required to reduce the number of fibers and to improve reliability.

The first effort in this direction used time division multiplex techniques. In such an arrangement, an optical fiber delivers a short duration optical pulse to the encoder. The encoder uses fiber optic couplers and fiber optic delay lines to time multiplex the binary encoder output signals as a sequence of optical pulses. This approach has several disadvantages which are all primarily associated with the need for the use of fiber optics delay lines. Conventionally, a delay line spool would be used, and this was found to be bulky and expensive to wind. Moreover, the fibers arranged in this configuration are subject to breakage when exposed to temperature extremes.

These and other difficulties with time division multiplexing caused experimentation with and the subsequent use of wavelength division multiplexing techniques.

Fiber optic encoders for creating the encoded wavelength division multiplex signal generally involve the use of a grated index rod lens (GRIN lens) having a glass wedge-grating assembly arranged at an end thereof. Broadband light enters the encoder system through the encoder input fiber and passes through a fiber coupler to the multiplexer/encoder. The multiplexer disperses the broadband spectrum of received light across the channels of a reflective code plate in wavelength bands. Those wavelengths directed to a channel in the logic zero state are, for example, absorbed by the code plate, while those wavelengths directed to a channel in the logic one state are, for example, reflected by the code plate and then retransmitted to the multiplexer input/output fiber by the grating-lens assembly. A coupler then directs the reflected light to a separate encoder output fiber for transmission from the encoder. Dual transmission fibers communicate the reflected light information to a receiver/demultiplexer. The demultiplexing operation is performed by a second grating assembly which, for example, disperses the spectrum on to a photo diode array. In the latter, each diode, for example, might correspond with a given wavelength band. The totality of the array then corresponds with a given code word, and the logical values of the bits forming the code word are determined by whether or not the elements of the array are actuated, i.e., whether or not there is reflected light appearing in the corresponding wavelength bands.

In these prior art fiber optic transducer assemblies, the decision as to whether a given photodiode is to be actuated indicating light in the corresponding wavelength band is generally by comparison of the value of the reflected light with some t value. It can be readily seen that in a system such as there are ample possibilities for power level variations for example, the light source and along the lengths of the fiber optic cables. Consequently, system power losses and corresponding level variations have produced errors in the presence or absence of reflected light in a given band. The errors produced by these threshold comparisons cast considerable doubt on the efficacy of this technique optically encoding sensed information.

SUMMARY OF THE INVENTION

The foregoing and other disadvantages found in conventional division multiplex optical encoders capable of providing information are addressed and overcome by the invention described and claimed herein. This invention removes the need for comparing reflected light signals with a predetermined threshold as a means for indicating the presence or absence of reflected or transmitted light in a given wavelength band.

In the digital fiber optical wavelength division multiplex transducer according to the invention means are provided for comparing the outputs of two detectors in an array at the receiving end to determine whether a given code bit is "on" or "off". When the bit is "on" the power received by the second detector will, for example, be greater than the power received by a first detector. When the bit is "off" the reverse will be true.

BRIEF DESCRIPTION OF THE DRAWINGS

FIG. 1 is an illustration of a segment of one code track on a code plate constructed according to the principles of the invention.

FIG. 2 is an illustration of a section of the plurality of code tracks appearing on a code plate constructed according to the principles of the invention.

FIG. 3a is a side view of an example of an encoder assembly used with the system of the invention.

FIG. 3b is a perspective view of the FIG. 3a embodiment.

DETAILED DESCRIPTION OF THE PREFERRED EMBODIMENT

Figure 4:
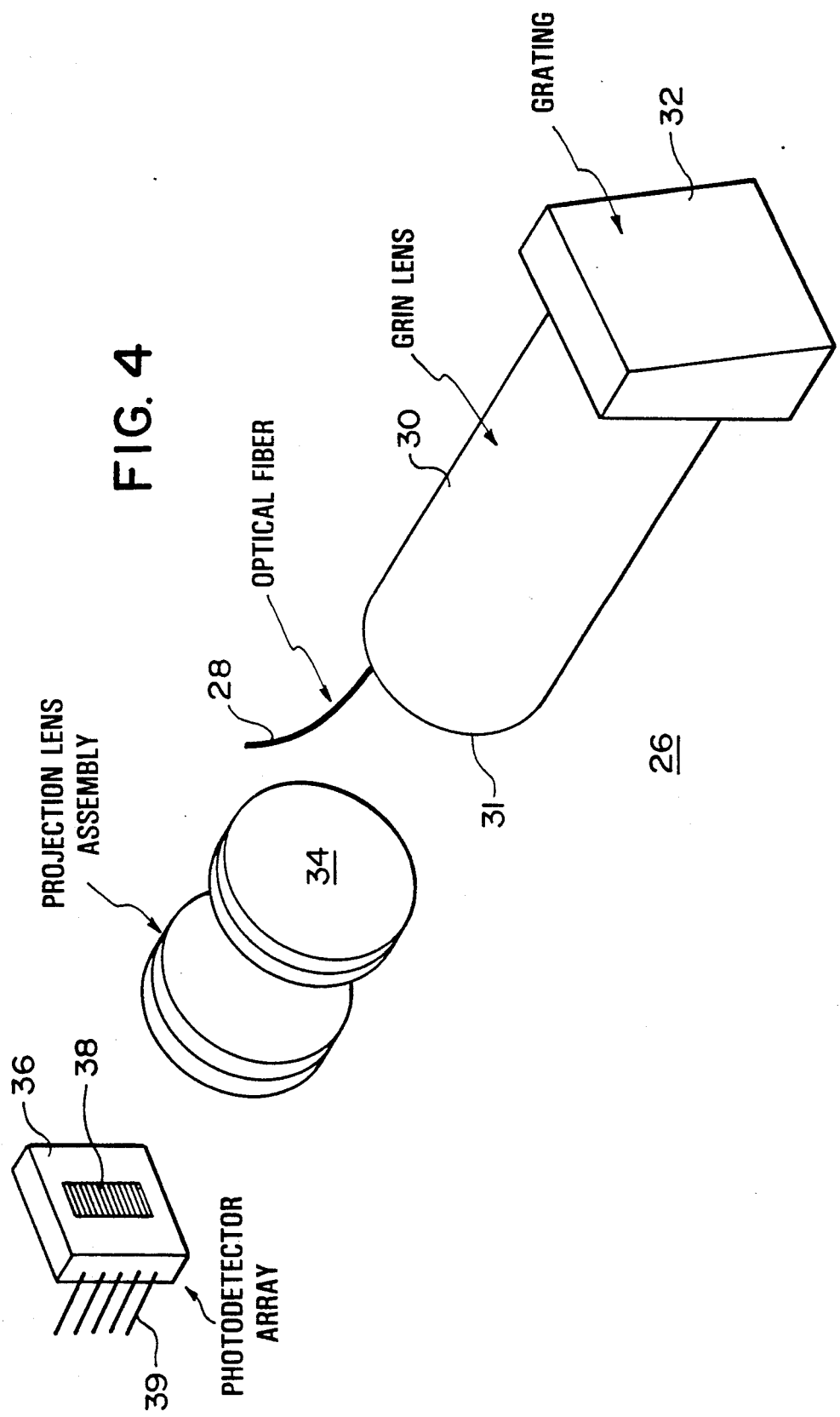
FIG. 4 is an exploded perspective view of a preferred embodiment of a detector assembly constructed according to the principles of the invention.

Referring to FIG. 1, this figure illustrates a small segment of one code track of a plurality of code tracks on a code plate constructed according to the principles of the invention. Each code track 10 is composed of, in this example, reflective strips 12 which in this case are alternating in lateral position. If, as in this example, the code plate is so positioned in relation to the chromatic read stripe 14 on the encoder assembly, (to be described in greater detail below) reflective light will be shown to be present in a given wavelength band. If the light content of that wavelength band is compared to the light content of the next adjacent wavelength band on the same code track 10, an "on" state will be indicated.

FIG. 2 illustrates a segment of a complete code plate constructed according to the invention having a plurality of code tracks 10. As before, the reflective portions of each code track are illustrated by numerals 12 and the light absorptive portions by the numeral 11. In FIGS. 1 and 2 the code tracks, depending on the parameter being monitored, move side to side of the figure in relation to encoder stripe 14.

FIGS. 3a and b illustrate views of an embodiment of the above described GRIN lens type reflective encoder assembly. This embodiment corresponds with the prior art encoder discussed hereinabove, but the code tracks 10 and code plate portions thereof are arranged in accordance with the principles of this invention.

This device in effect, casts a chromatically dispersed stripe of light onto a code plate 16. The specific physical position of the code plate in relation to the encoder assembly is determined by the parameter being monitored, which for example, might be the position of a mechanical component such as an aircraft throttle. Light is reflected from reflective portions 12 of the code plate and reinjected into optical fiber 18.

In this embodiment optical fiber 18 supplies light from a source (not shown). This light source should be one having a relatively large spectral width, i.e., one large enough to cover all of the wavelengths corresponding to the code tracks on code plate 16. Examples of such light sources are light emitting diodes, optically combined light emitting diode arrays and tungsten filament type light bulbs.

Light from fiber 18 is focused through GRIN lens 20 to wedged optical grating 22. In this example a Littrow-mounted reflective diffraction grating is shown. The grating disperses the light into a plurality of wavelength bands which are spatially spread and focussed through the lens 20 to an elongated image or read stripe 14. Read stripe 14 is coincident with code plate 16 and is spread along its longest dimension. Depending on the position of code plate 16, reflected light in specific ones of the wavelength bands re-enters GRIN lens 20 and retraces its path through and is transmitted into fiber 18.

The reflected light is coupled through optical fiber 18 and the remainder of the system to detector system 26. This detector system utilizes spectral multiplexing, i.e., different detectors respond to different wavelengths.

In the FIG. 4 detector system, reflected light which has been in effect filtered by the FIG. 3 encoder assembly is supplied to another GRIN lens 30 via optical fiber 28. This light is focused by the lens onto a similar diffraction grating 32 which causes the light to be spread laterally according to wavelength band, and this light is then focused on the end 31 of lens 30. This end therefore contains an image of a read stripe similar to that shown in FIG. 3 through which the light is focused.

A projection lens assembly 34 focuses light issuing from the read stripe (not shown) onto a photo detector array 36. Photo detector 36 contains an array of photo sensitive elements 38, such as an array of photo diodes. Each element 38 is positioned according to a wavelength band to which it is to respond. If light appears in a wavelength band corresponding to a given element 38, an electrical signal will appear on an output lead 39 connected to that element 38. Each detector element in the array then corresponds to a unique narrow wavelength band. In this arrangement a pair of adjacent detectors corresponds to a code track 10.

Figure 5:
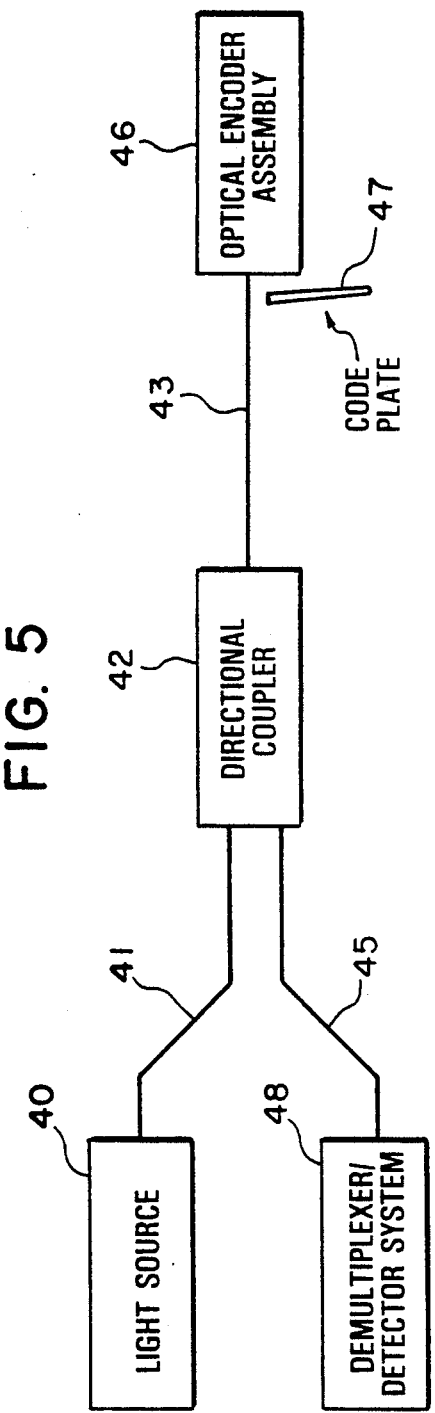
FIG. 5 is a power/optical wavelength curve illustrating the power relationships of two segments of a code track on the code plate according to the invention.

FIG. 5 illustrates in diagrammatic form a complete system constructed according to the invention. Light source 40 supplies a spectrally broad light signal to optical cable 41 which communicates the light through directional coupler 42 and optical fiber 43 to the optical encoder 46. This optical encoder 46 operates as described in connection with FIGS. 3a and 3b above to produce reflected light in wavelength bands as determined by the position of code plate 48. This reflected light is communicated via optical fiber 43 to directional coupler 42, and from there through optical fiber 45 to a demultiplexer/detector system 48 which is constructed and operates as described in connection with FIG. 4 above. It is to be noted that while the optical encoder illustrated in this figure uses reflected light, transmitted light can be used to the same effect.

Figure 6:
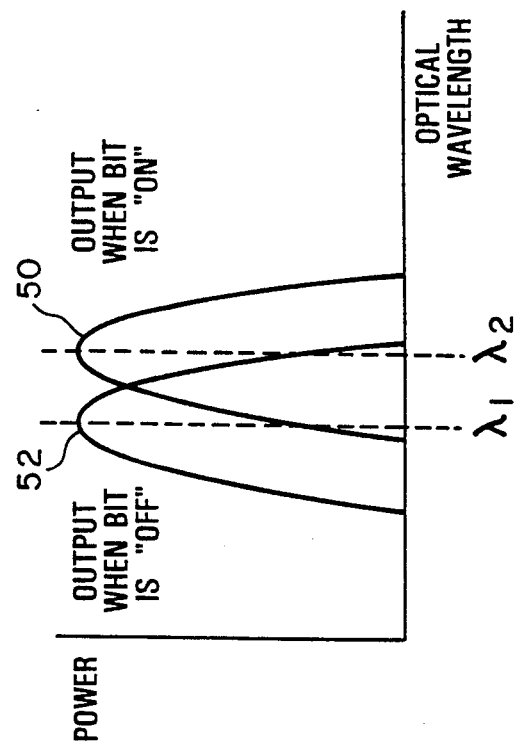
FIG. 6 is a block circuit diagram illustrating a complete encoder/detector system constructed according to principles of the invention.

FIG. 6 illustrates the optical response of the system when the on and off reflected portions of a code track 10 (see FIGS. 1 and 2) are, respectively, in light registration with a read stripe 14. If the reflected portion of the code track relating to the "on" position is in registration with the read stripe, a spectral peak 50 corresponding to that bit will be at wavelength 2. As the code track moves past read stripe 14, the peak, depending on the code arrangement being used, might move to wavelength 1 and produce a peak 52 at that point. If two detectors in the photo detector array are used per bit, one at wavelength 1 and one at wavelength 2, and their outputs compared, when the bit is "on", the power received by the second detector will be greater than the power received by the first detector. When the code track is positioned so that the off portion of the track is adjacent to the read stripe, the reflected light will be in a wavelength corresponding to the "off" position, and the reverse power relationship will be true.

It can be seen then, that these detectors can be compared with each other and a decision made as to whether a bit is on of off is made by simply comparing power levels.

This contrasts with prior art systems wherein the on/off decision was made by comparison of a received power level with a preset threshold. The prior art technique cannot compensate for any variation of system power loss since the threshold must be at a precise level relative to incoming power levels to give proper on and off signals.

I claim:

1. A digital fiber optic wavelength division multiplex transducer comprising:

first chromatic light dispersing means for dividing received light into a plurality of wavelength bands, and spatially spreading the bands in one direction, said light dispersing means having an elongated aperture, the longest dimension of which extends in the same direction as the direction in which said wavelength bands are spatially spread, first means for communicating light from a source to said light dispersing means, code plate means which moves orthogonally to the longest dimension of said elongated aperture, the position of said code plate being determined by a physical parameter being monitored, said code plate means having a plurality of code tracks extending in the same direction as the direction of movement of said code plate means, each code track being comprised of light responsive material arranged in a step-wise manner in adjacent wavelength bands in accordance with the digital code being used, each step having a first and second wavelength band such that when light responsive material is placed in the first wavelength band a first logic value is indicated and when light responsive material is placed in the second wavelength band position a second logic value is indicated, said first and second wavelength positions extending perpendicularly to the length of a code track and the longest dimension of said light collimating means aperture, second means for communicating filtered light issuing from those portions of said light responsive materials on said code track which are in registration with said first light dispersing means aperture.

demultiplexing means for receiving filtered light from said second means for communicating, said demultiplexer means comprising:

second chromatic light dispersing means having an elongated aperture for dividing the received filtered light into wavelength bands and spatially spreading them along the longest dimension of said elongated aperture, an array of photosensitive elements for converting received light signals into electrical signals, said array being arranged in said second light dispersing means, each photosensitive element corresponding to a different wavelength band, pairs of photosensitive elements corresponding to a given code track, and means for comparing the electrical signals from ones of said photosensitive elements in a pair to determine the logic state of a code track, the logic states of the plurality of code tracks forming a digital word.

2. The transducer defined in claim 1 wherein said light responsive material is a light reflecting material.

3. The transducer defined in claim wherein said light responsive material is a light transmissive material.

4. The transducer defined in claim 1 wherein said first and second means for communicating are a single optical fiber.

5. The transducer defined in claim 4 wherein said first and second light collimating means comprise a lens for receiving and focusing light from said single optical fiber and a diffraction grating for dividing the received light into wavelength bands spatially spread along the longest dimension of said elongated aperture.

* * * * *